United States Patent [19]

Powell

[11] Patent Number: 4,532,562
[45] Date of Patent: Jul. 30, 1985

[54] SERVO CONTROL OF SEEK OPERATION IN MAGNETIC DISK DRIVE

[75] Inventor: Steven H. Powell, Ogden, Utah

[73] Assignee: Iomega Corporation, Ogden, Utah

[21] Appl. No.: 554,897

[22] Filed: Nov. 25, 1983

Related U.S. Application Data

[62] Division of Ser. No. 257,484, Apr. 24, 1981, Pat. No. 4,439,800.

[51] Int. Cl.³ .............................................. G11B 21/08
[52] U.S. Cl. .......................................... 360/78; 318/561
[58] Field of Search .......................... 360/78, 75, 77; 318/561, 571

[56] References Cited

U.S. PATENT DOCUMENTS

| | | | |
|---|---|---|---|
| 3,699,555 | 10/1972 | Du Vall | 360/78 |
| 4,115,823 | 9/1978 | Commander et al. | 360/78 X |
| 4,237,502 | 12/1980 | Erickson, Jr. et al. | 360/78 |
| 4,272,793 | 6/1981 | Landingham | 360/99 X |
| 4,297,734 | 10/1981 | Laishley et al. | 360/77 X |

FOREIGN PATENT DOCUMENTS 0013326  7/1980  European Pat. Off. .
2011654  7/1979  United Kingdom .

OTHER PUBLICATIONS

Patent Abstracts of Japan, vol. 4, No. 118, Aug. 22, 1980, p. 90P24, K. K. Fujitsu, "Automatic Gain Control System".

*Primary Examiner*—John H. Wolff
*Attorney, Agent, or Firm*—Woodcock Washburn Kurtz Mackiewicz & Norris

[57] ABSTRACT

An improved method and apparatus for servo control of the position of a read/write head with respect to a magnetic disk is disclosed. The disk comprises permanently recorded position data information. Upon initiation of a head traverse or "seek" operation, the microprocessor is controlled to select predetermined portions of instruction sequences, all of which sequences are used in the event the seek is such that the head reaches its maximum velocity. Otherwise, portions of the accelerate and decelerate command sequences are chosen together with constant velocity commands as necessary to insure that the head is decelerated smoothly to a stop at the appropriate position.

5 Claims, 4 Drawing Figures

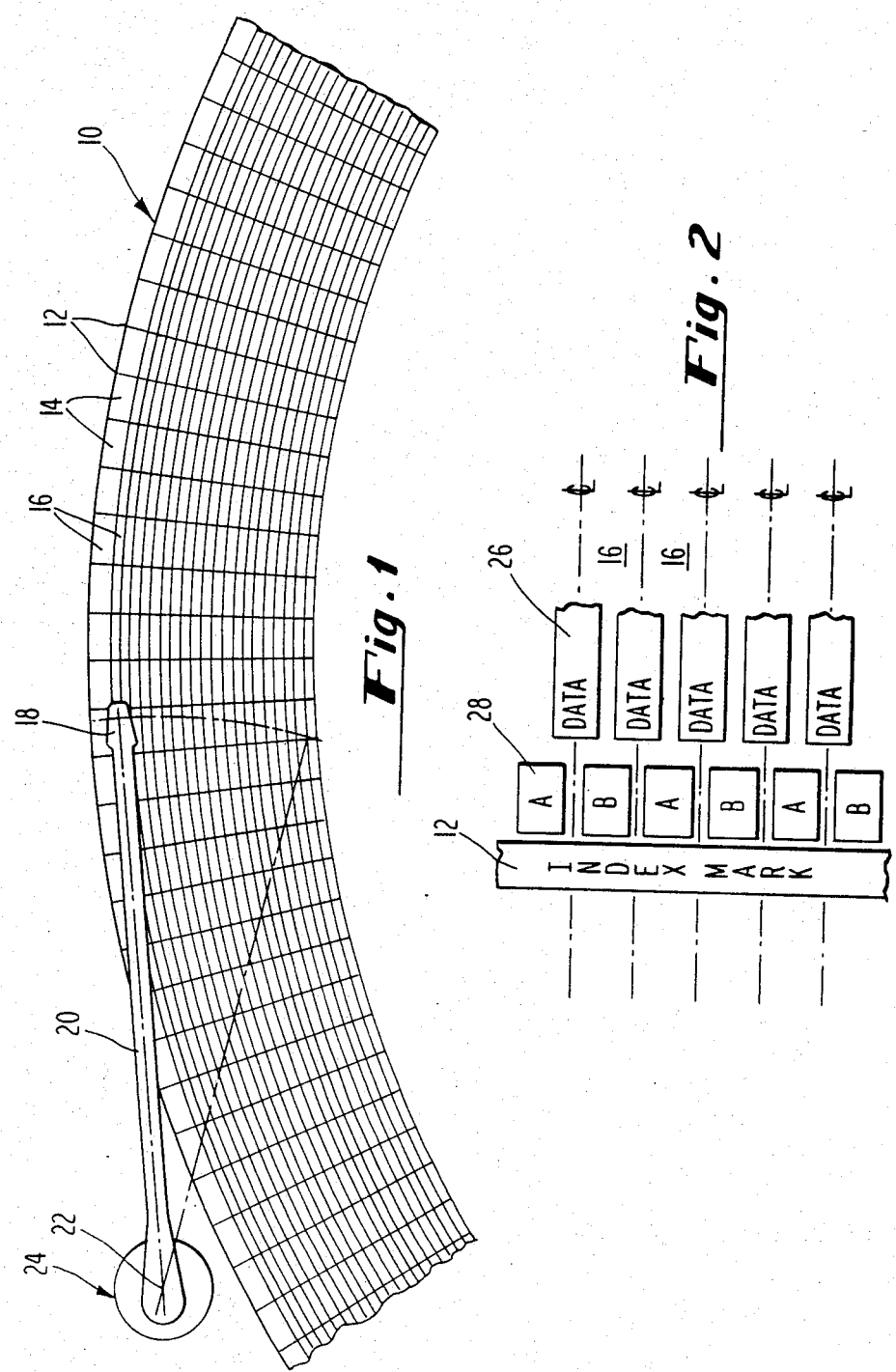

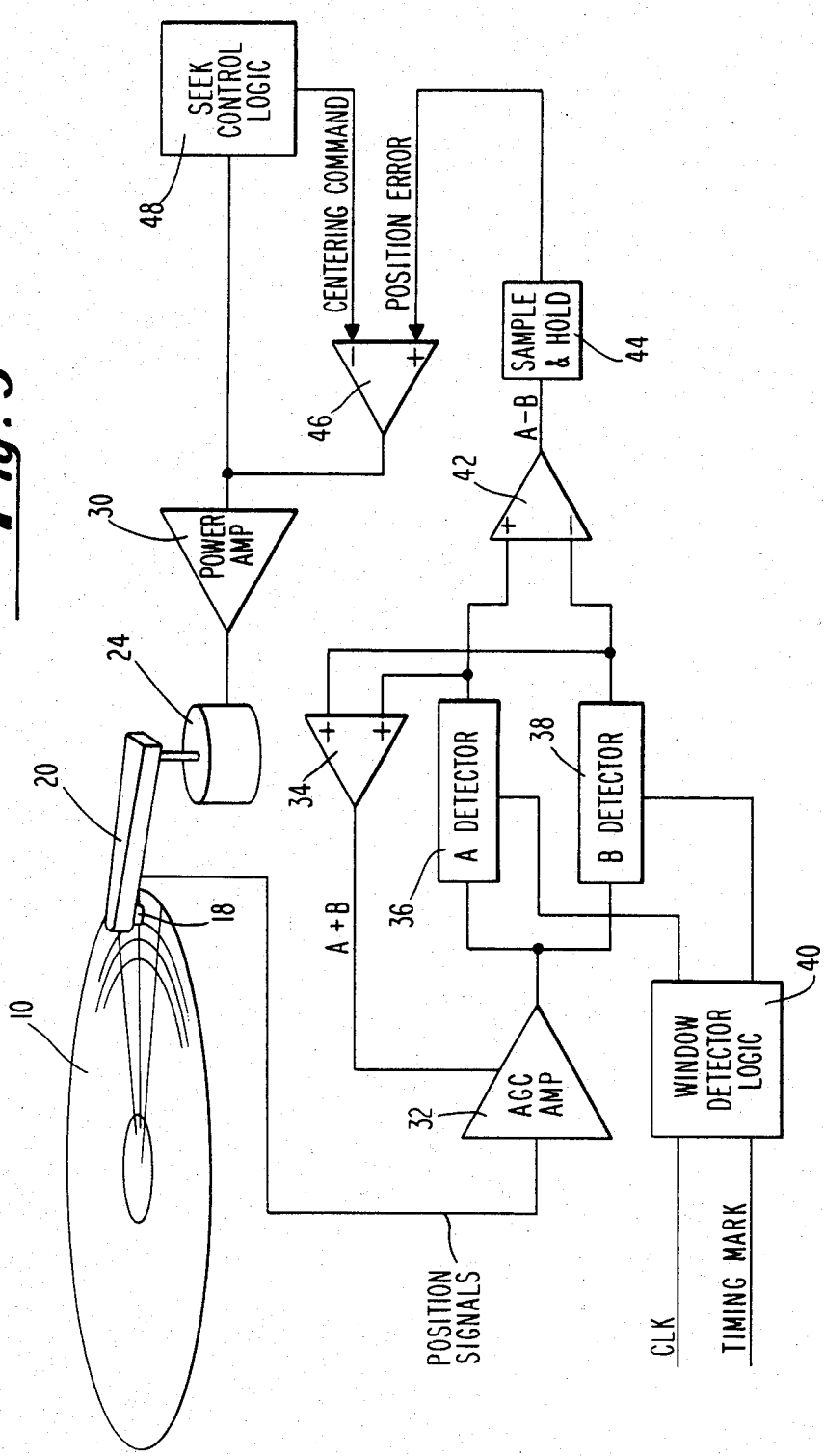

SERVO CONTROL OF SEEK OPERATION IN MAGNETIC DISK DRIVE

This is a division, of application Ser. No. 257,484, filed 4/24/81 now U.S. Pat. No. 4,439,800.

FIELD OF THE INVENTION

This invention relates to methods and means for control of magnetic disk drives. More particularly, the invention relates to a method for controlling the movement of the read/write head with respect to the surface of the disk in a magnetic disk drive.

BACKGROUND OF THE INVENTION

This invention, as noted, relates to magnetic disk drives, specifically those of the type in which position information is encoded onto portions of the disk. The disk is divided into sectors for the recording of data. At the time of manufacture of the disk the sectors are defined by index marks which are encoded radially across the surface of the disk, without regard to specific track. The tracks are defined by writing of additional signals at the beginning of each track, following the index mark. The data field follows the position information in each track per each sector. This is in distinction to a prior art practice in which position data was written to a complete track; that is, at least one track contained no data field.

It will be appreciated by those skilled in the art that it is important to control the position of the read/write head with respect to the track, both as to proper maintenance of the disk over the center of the track when a desired track has been located, and in connection with moving the head from one track to another upon command; that is, during a "seek" operation. According to co-pending application Ser. No. 257,608 filed Apr. 27, 1981, position data written immediately following the index mark is used in a servo loop to maintain centering of the head over the track. Clearly, it would be advantageous to use as much of this circuitry as possible in the control of a seek operation. Moreover, it would be desirable to accomplish the seek operation in an expeditious and as rapid a fashion as possible, and moreover, to do so without additional circuit complexity. Those skilled in the art will recognize that one possible way of implementing a seek operation is to calculate in advance each of the acceleration, steady-speed and deceleration operations performed by the head with respect to the disk during a seek operation, but will additionally recognize that to store each the individual acceleration, constant-velocity and deceleration segments of each seek profile would require large amounts of memory. Accordingly, it would be desirable to avoid this practice.

OBJECTS OF THE INVENTION

It is therefore an object of the invention to provide a servo circuit for controlling the motion of a read/write head with respect to a disk during a seek operation which requires minimal additional components to be added to the circuitry used to control the centering of the head over a desired track.

It is a further object of the invention to provide means for controlling a seek operation whereby individual seek profiles are not stored, such that large quantities of memory are not required.

It is a further object of the invention to provide such a readily implementable seek operation at no cost to performance.

Still a further object of the invention is to provide an improved magnetic disk drive.

Other aspects and objects of the invention will appear to those skilled in the art.

SUMMARY OF THE INVENTION

The above needs of the art and objects of the invention are satisfied by the present invention which comprises means and methods for performing a seek operation. When a seek operation is initiated, the first step is to determine whether its length is so short that one of a small number of precalculated acceleration/deceleration profiles stored in memory can be used. If so, this is done. If not, the seek profile is calculated using portions of predetermined acceleration and deceleration profiles stored in memory. The selected portions are spaced by "coast", i.e., constant velocity operations used after the head has reached its maximum velocity. Additional coast operations may be interspersed in the deceleration profile to insure that the head is smoothly decelerated to a stop over the proper track at the proper time. The circuit implemented uses the track centering circuit described in the co-pending application referred to above and supplies a correction to the position error signal the centering circuit generates so that it can be used even though the trajectory of the head with respect to the disk is not such that the head is centered over the track during its detection of the address mark and position servo information.

BRIEF DESCRIPTION OF THE DRAWINGS

The invention will be better understood if reference is made to the accompanying drawings, in which:

FIG. 1 shows an overview of the general layout of the magnetic disk recording system of the invention;

FIG. 2 shows a more detailed view of addressing and indexing information permanently written to the disk at its time of manufacture, and the way in which the data fields coincide therewith;

FIG. 3 shows a circuit used to implement the present invention; and

DESCRIPTION OF THE PREFERRED EMBODIMENTS

Figure 4:
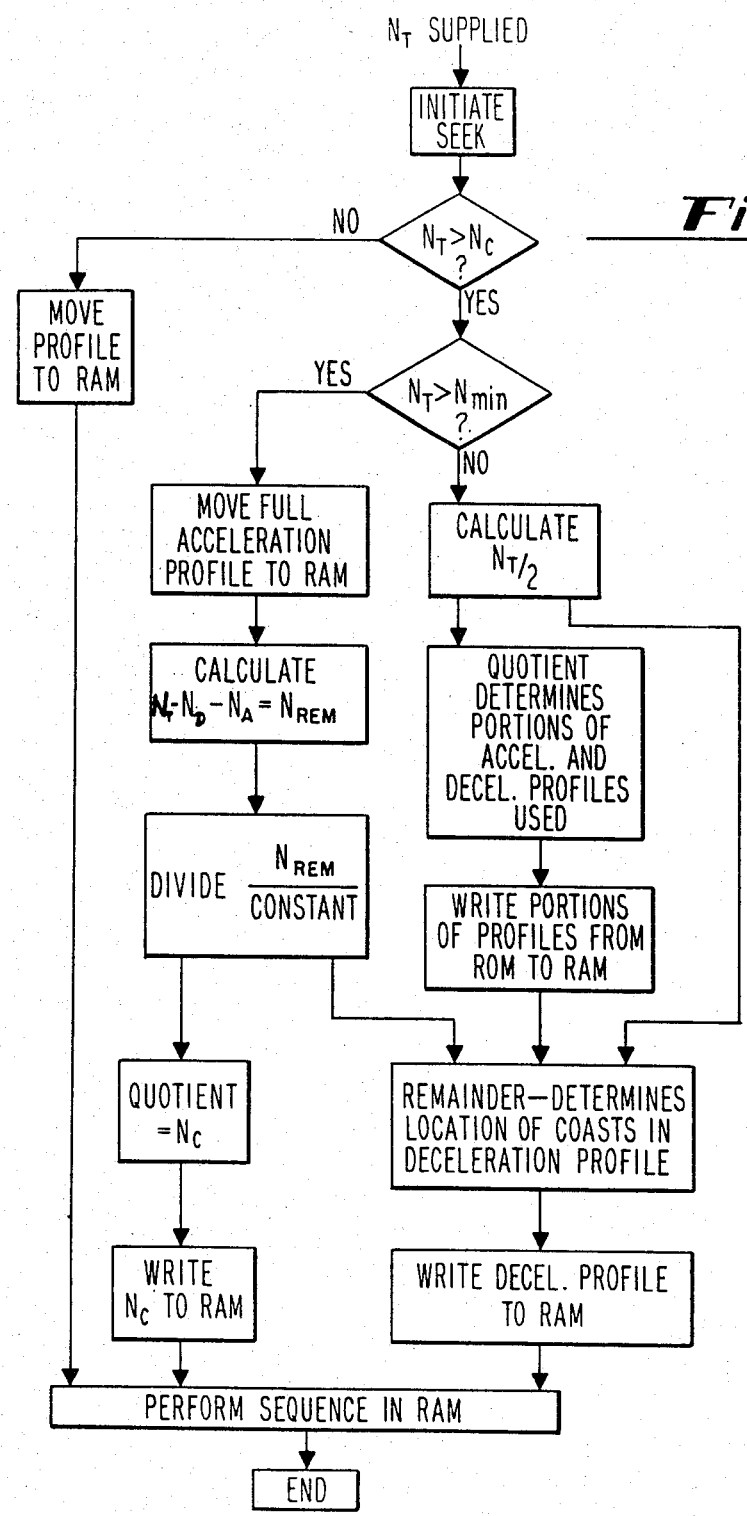
FIG. 4 shows a flowchart of the calculation of the seek profile performed for each seek operation.

FIG. 1 shows the layout of the disk drive according to the invention. The magnetizeable surface of the disk 10 is divided by address marks 12 into sectors 14. In a presently preferred embodiment, an 8-inch so-called "floppy" disk is divided into 70 sectors. The address marks are permanently written on the floppy disk at the time of its manufacture, as may be position information to be discussed below in connection with FIG. 2, which defines the position of the tracks indicated generally at 16 for the writing of data thereto. The index marks do not vary with respect to the tracks.

Juxtaposed to the disk 10 is a read/write head indicated generally at 18 carried by a servo arm 20, pivoted about an axis 22 under the influence of a servo motor indicated generally at 24. The read/write head 18 picks up position information written in proximity to each of the index marks 12, and circuitry to be discussed below in connection with FIG. 3, uses this position information and to provide suitable control signals to the motor 24. As discussed above, the position of the head 18 with respect to the track 16 is controlled both as to centering when a particular track is to be accessed and as to moving the head from one track to the other during a seek operation. Co-pending application Ser. No. 257,608 filed Apr. 27, 1981 referred to above, and incorporated herein by reference, describes the centering operation. The present application relates to the seek operation. When a command is received by the disk drive according to the invention to the effect that a track other than that to which the head is presently juxtaposed is to be accessed, the servo motor 24 must be controlled to rotate the arm 20 carrying the head 18 about the axis 22 so as to reach the sought for track. As will be apparent from FIG. 1, as the disk 10 rotates with respect to the head 18 various address marks 12 and data fields pass thereunder. By detection of the position information by the head, the circuitry at all times "knows" where it is both with respect to its radial track location, and with respect to which sector of the track is juxtaposed to the head at any given time, thus completing the servo loop.

FIG. 2 shows details of the position information written at the beginning of each data field for each sector which is used in the control of the seek operation. An index mark 12 extends across the disk at the beginning of each sector without regard to track location. The center lines of the tracks 16 are shown; data fields 26 are centered thereon. Following the index mark 12 and spaced between the center lines of the tracks is position information signals 28 referred to as A and B, as they vary from one another in order to enable appropriate decoding of the position information, as fully discussed in the co-pending application referred to above. Additional position information centered on the track would also typically be provided, again as discussed in the co-pending application referred to above; detailed discussion of that information is not required for an understanding of the present invention.

FIG. 3 shows circuitry useful in practicing the method of the present invention. Much of the circuitry shown in FIG. 3 is in common with that described in the co-pending application referred to above.

Thus, in FIG. 3 the servo motor 24 is controlled in accordance with signals supplied to it from a power amplifier 30 to move the read/write head 18 carried by the servo arm 20 with respect to the disk 10. The read/write head 18 picks up position as well as data signals from the disk 10; the position signals are passed to an automatic gain control amplifier 32 controlled in accordance with the output of a summing node 34, adding the A and B position signals together in order to maintain the overall amplitude of the position signal information at a constant level. The A and B position signals are passed to an A detector 36 and a B detector 38, respectively, under the control of window detector logic 40, which in accordance with detection of the timing mark and a clock signal signifies which of the A and B signals is expected at any given time. The A and B signals are subtracted from one another in a node 42; the A-B signal, which is zero when the head is properly centered between the A and B position information, is passed to a sample and hold element 44. The output of this element 44, the position error signal, is then passed to a comparator 46 where it is compared with a command signal. If the head is to remain at the center of the track, the "centering" command signal would ordinarily be zero; if the position error signal is likewise zero, no signal will be passed to the power amplifier 30, which connection completes the loop. If, on the other hand, there is a position error signal, the power amplifier will be controlled to operate the servo motor 24 to vary the relative position of the head with respect to the disk.

Those skilled in the art will appreciate that the servo motor may be likewise controlled by the power amplifier during the seek operation. FIG. 3 shows seek control logic 48, to be discussed in further detail below, providing an input to the power amplifier. The seek control logic also provides the centering command to the comparator 46. It will be appreciated that the output of the sample and hold element 44 to the comparator 46 is a signal indicative of the relative position of the read/write head with respect to the center of the track whenever the head is juxtaposed to the A and B position signals. If during a seek operation, the trajectory of the head with respect to the sector is such that it does not pass precisely over the center of the track while the A and B position signals are juxtaposed to the head, a position error signal will be generated. Since the trajectory chosen for the head in a seek operation is not necessarily such as to coincide with the centers of the tracks at the points where the A and B position signal information is recorded, the seek control logic 48 provides a centering command to the comparator taking this into account. Thus, if the trajectory varies from that decided upon by the seek control logic, the circuitry of FIG. 3 will provide an automatic additional correction to the power amplifier 30 for supply to the servo motor 24 using precisely the same circuit elements and position information as used ordinarily to control the centering of the head with respect to the disk.

Those skilled in the art will recognize that a read/write head mounted on an arm pivoting about an axis spaced from the disk, i.e., a "record player" type arm, as distinguished from one always tangent to the data track, can be controlled so that the track spacing is equal, that is, by varying the increments of the arm's angular rotation about its axis per track, or so that the angular increments are equal, thus varying the track spacing, the inner tracks being closer together. In the presently preferred embodiment, the second possibility is chosen; that is, the servo motor is controlled so that the angular increments of arm rotation per track is equal, The inner tracks on the disk will thus be spaced more closely together. Control of the servo motor thus realized is greatly simplified. The trajectory of each "jump" between tracks of identical spacing is the same, regardless of the actual initial and final track positions of the head and of whether the jump is clockwise or counter-clockwise with respect to the axis of the servo motor. Accordingly, the number of individual head trajectories which must be provided for is equal to the number of tracks less one. In a presently preferred embodiment 306 tracks are accessible by the head, so that 305 possible trajectories must be provided for.

It will be appreciated by those skilled in the art that the method generally employed to operate a servo motor under microprocessor control involves the stepping of the current supplied to the motor through a series of steps under the control of the processor. That is, the processor outputs a series of commands which are compared with an signal physically output by the mechanical apparatus under control, so as to provide a servo loop. For each trajectory a relatively extensive series of commands is required if the head is to be moved from track to track with reasonable speed. Accordingly, it will be appreciated that to store each step of each trajectory in, for example, a read only memory (ROM) for each of the 305 possible trajectories would require enormous quantities of ROM. Instead, according to the present invention the trajectories are individually and adaptively calculated for each seek operation, the calculation proceeding even after the operation is begun. Only in a few short jump situations, where there is insufficient time to complete the calculation are each of the commands to be output by the microprocessor to the servo motor stored in a look-up table or read only memory (ROM) and not calculated. Instead, typical accelerate and decelerate profiles are stored in ROM and the appropriate portions of these profiles to be used are selected by the microprocessor and are written by it to a table of commands stored in random-access memory (RAM). Coast instructions corresponding to portions of the trajectory in which the head is only accelerated or decelerated as necessary to keep moving at constant velocity are interspersed between the accelerate and decelerate profiles in order to generate the total profile for the given seek operation. One or more coast commands may additionally be interspersed in the decelerate section of the profile, so as to insure that the head arrives at the appropriate track after a smooth and gradual deceleration.

FIG. 4 shows a detailed flow chart of the method whereby the profile for traverse of any given number of tracks $N_t$ is calculated. $N_t$ is supplied by the disk controller, initiating the seek routine. If $N_t > N_c$, $N_c$ being equal to the minimum number of tracks for which a profile is calculable, determined on the basis of the time taken for the calculation, the calculation is begun. If not, a profile of this traverse stored in read-only memory (ROM) at the time of construction of the disk drive is moved to random access memory (RAM) which is accessed by the microprocessor to supply commands to the circuitry shown in FIG. 3 for performance.

If the traverse is calculable, the first question is whether $N_t$, the number of tracks to be traversed, is greater than the $N_{min}$, the minimum number of tracks for which the maximum velocity of the servo system is reached. If the answer to this question is yes, it is desirable that the acceleration to that speed be as rapid as possible. Accordingly, the full acceleration profile is moved from ROM to RAM and performance begun. Next, $N_a$, the number of tracks traversed during performance of the full acceleration profile, and $N_d$, the number traversed during deceleration from maximum velocity, are subtracted from $N_t$, leaving the remaining number of tracks, $N_{rem}$. $N_{rem}$ is divided by a constant, the constant being indicative of the maximum velocity of the servo system. The quotient of this division is equal to the number of coasts, that is, the number of steps during which neither acceleration nor deceleration is supplied to the servo motor. The velocity is then maintained at its constant speed by the position error signal derived in accordance with the circuit discussed above in connection with FIG. 3. It will be noted in this connection by those skilled in the art that it is advantageous for better control of this coasting operation that the maximum velocity of the servo is some integral number of tracks traversed per sector traversed (hereinafter tracks/sector) so that as much position information is derived from each sector as possible. In a presently preferred embodiment, it is found that the speed of four tracks per sector is readily available; further improvement appears likely.

The quotient of the division of $N_{rem}$ by the constant may be termed $N_c$, the number of coasts interposed between the acceleration and deceleration operations. $N_c$ is written to RAM and used to control this portion of the velocity profile. The remainder of this division determines the location of additional coasts interposed in the deceleration profile to insure that the head is smoothly decelerated to a stop over the appropriate track from its maximum velocity. That is, the size of the remainder, in tracks, is equated to that location in the decelerate profile at which an additional coast step is inserted. The total deceleration profile is then written to RAM, thus completing calculation of the overall velocity profile.

If, instead, the total number of tracks to be traversed $N_t$ was not greater than $N_{min}$, $N_t$ is divided by a constant, typically 2. That is, the total number of tracks is divided between acceleration and deceleration, which are performed at equal rates. The integral portion of this quotient then determines the number of tracks each traversed during acceleration and deceleration, and the appropriate portions of the acceleration and deceleration profiles stored in ROM are then written to RAM. The remainder from this division is then treated in the same way as that discussed above with respect to the division of $N_{rem}$ by a constant, that is, the remainder is used to determine the location of coast sectors in the deceleration profile, which is then written to RAM for execution.

As discussed above, the trajectory taken by the servo in moving from one track to another is chosen to achieve this jump in the minimum time. Accordingly, while the only servo position information available to insure that the trajectory is being followed correctly is that written immediately after each index mark, it is important to make some correction to the servo circuit to allow for the possibility that the read/write head is not exactly positioned over the center line of the track when the position error information immediately following the index mark passes the head. What is done is that a position error correction signal is generated by the microprocessor and fed to the comparator which is used in the control of the head with respect to the center line of the track, so that the output of this circuit is indicative that the trajectory is being followed accurately, even where it does not coincide with the center of the track at the position of the address information, as discussed above in connection with FIG. 1. Table I shows the overall profile of a seek operation in a traverse of some 31 tracks. The seek is performed such that a total of 25 sectors pass beneath the read/write head during the traverse of the 31 tracks. The Table shows that the first 11 sectors are traversed in a constant acceleration mode, so that the velocity of the servo (expressed in tracks per sector) continually increases. A first deceleration sector is then undergone followed by a coast, inserted to insure that the velocity of the servo reaches zero at the proper location. A steady deceleration profile is then followed. In each case the acceleration or deceleration constant is 0.2 tracks per sector per sector. The position error signal (PES) used as a correction signal to the centering comparator is shown. It is also noted on Table I that the maximum velocity reached by the servo in the embodiment depicted is four tracks per sector, though this is not reached in the profile of the 31 track trajectory depicted in Table I.

TABLE I

| SECTOR | ACCEL | COAST | DECEL | DIST | VELOCITY | PES |
|---|---|---|---|---|---|---|
| 0 | * | | | 0 | 0 | +0.000 |
| 1 | * | | | .1 | .2 | +0.100 |
| 2 | * | | | .4 | .4 | −0.100 |
| 3 | * | | | .9 | .6 | −0.100 |
| 4 | * | | | 1.6 | .8 | +0.100 |
| 5 | * | | | 2.5 | 1 | +0.000 |
| 6 | * | | | 3.6 | 1.2 | +0.100 |
| 7 | * | | | 4.9 | 1.4 | −0.100 |
| 8 | * | | | 6.4 | 1.6 | −0.100 |
| 9 | * | | | 8.1 | 1.8 | +0.100 |
| 10 | * | | | 10 | 2 | +0.000 |
| 11 | * | | | 12.1 | 2.2 | +0.100 |
| 12 | | | * | 14.4 | 2.4 | −0.100 |
| 13 | | * | | 16.7 | 2.2 | +0.200 |
| 14 | | | * | 18.9 | 2.2 | −0.100 |
| 15 | | | * | 21 | 2 | +0.000 |
| 16 | | | * | 22.9 | 1.8 | −0.100 |
| 17 | | | * | 24.6 | 1.6 | +0.100 |
| 18 | | | * | 26.1 | 1.4 | +0.100 |
| 19 | | | * | 27.4 | 1.2 | −0.100 |
| 20 | | | * | 28.5 | 1 | +0.000 |
| 21 | | | * | 29.4 | .8 | −0.100 |
| 22 | | | * | 30.1 | .6 | +0.100 |
| 23 | | | * | 30.6 | .4 | +0.100 |
| 24 | | | * | 30.9 | .2 | −0.100 |
| 25 | * | | | 31 | 0 | +0.000 |

MOVE = 31
ACCEL CONSTANT = .2
MAX VEL = 4
SEEK TIME = 14.2857MS

Those skilled in the art will recognize that there has been described a method and apparatus for generating a seek profile for use in connection with the motion of a read/write head with respect to a disk drive, in which each individual profile (save the very shortest) is individually generated each time the seek operation is sought to be performed. The invention utilizes the fact that the initial few steps of each seek operation are always acceleration in order to obtain time to perform the calculation of the remainder of the profile. In each case, the microprocessor controlling the operation selects portions of stored acceleration and deceleration profiles and uses these together with a calculated number of coast operations, in which the velocity of the servo head is maintained constant, to generate the total profile. Those skilled in the art will recognize as well that the invention may have applicability to other forms of servo systems, and that therefore the scope of the invention should not be read as limited by the above disclosure but only by the following claims.

I claim:

1. A method of controlling the motion of a read/write head juxtaposed to a magnetic recording disk having permanently recorded position information data recorded at spaced locations thereon, comprising the steps of:
    generating a series of commands predicated on the motion commanded, for successive comparison with actual position signals output by servo mechanism means controlling the position of said head;
    said series of commands being generated by selection of portions of stored command sequences, and addition of calculated numbers of additional commands;
    said selection and said addition steps being performed in response to each motion command.

2. The method of claim 1 wherein the accuracy of performance of said motion is measured by coincidence of said read/write head to said permanently recorded position information encoded on said disk at intervals throughout said operation.

3. The method of claim 2 wherein said generated series of commands represents an ideal trajectory of motion of said read/write head, and predicted deviations of said trajectory from the centers of said tracks are calculated and supplied to correction circuitry for compensation, so that said correction circuitry is used to detect whether said head is correctly oriented with respect to the center of a particular disk track at intervals in said motion.

4. In apparatus for storage of digital data on a magnetic disk, comprising:
    a read/write head adapted to be moved under the control of servo motor means relative to said disk, said head being adapted to detect position information written to said disk for control of said servo motor, said servo motor being controlled by means for comparing said detected position information with a sequence of position commands,
    the improvement which comprises means for selecting portions of predetermined sequences of position commands indicative of acceleration and deceleration of said head for said comparison by said means for comparing, and for adding position commands indicative of constant velocity to said selected portions, whereby a complete sequence of position commands for comparison is generated uniquely for each motion commanded.

5. The apparatus of claim 4 wherein said means for selecting said portions of predetermined sequences of commands comprises microprocessor means.

* * * * *